United States Patent [19]

Nozaki

[11] 3,857,893
[45] Dec. 31, 1974

[54] PRODUCTION OF DIETHYL KETONE
[75] Inventor: Kenzie Nozaki, El Cerrito, Calif.
[73] Assignee: Shell Oil Company, New York, N.Y.
[22] Filed: Dec. 17, 1969
[21] Appl. No.: 885,998

[52] U.S. Cl. .................. 260/597 A, 260/604 HF
[51] Int. Cl. ............................................. C07c 45/08
[58] Field of Search ....... 260/597 A, 604 HF, 597 R

[56] References Cited
UNITED STATES PATENTS

| | | | |
|---|---|---|---|
| 2,053,233 | 9/1936 | Woodhouse | 260/597 A |
| 2,327,066 | 8/1943 | Roelen | 260/597 A |
| 2,473,995 | 6/1949 | Gresham et al. | 260/597 A |
| 2,576,113 | 11/1951 | Hagemeyer et al. | 260/597 |
| 3,059,031 | 10/1962 | Alderson | 260/597 |

FOREIGN PATENTS OR APPLICATIONS

| | | | |
|---|---|---|---|
| 500,802 | 3/1954 | Canada | 260/597 A |

Primary Examiner—Bernard Helfin
Assistant Examiner—W. B. Lone
Attorney, Agent, or Firm—Henry C. Geller; Norris E. Faringer

[57] ABSTRACT

Production of diethyl ketone at high selectivity and rate by the reaction of ethylene, carbon monoxide and hydrogen under mild conditions of temperature and pressure in the presence of a cobalt carbonyl catalyst and ammonia or a primary or tertiary amine as catalyst promoter.

7 Claims, No Drawings

PRODUCTION OF DIETHYL KETONE

BACKGROUND OF THE INVENTION

Roelen, in U.S. Pat. No. 2,327,066, issued Aug. 17, 1943, discloses that the reaction between ethylene, carbon monoxide and hydrogen in the presence of a cobalt-thorium-kieselguhr catalyst produces diethyl ketone as a by-product in minor amount. Gresham et al., in U.S. Pat. No. 2,473,995, issued June 21, 1949, disclose that, in the reaction between ethylene, carbon monoxide, and hydrogen in the presence of cobalt carbonyl, diethyl ketone is obtained in improved yield when the reaction is carried out at pressures in excess of 300 atmospheres and with reactant ratios of particular ranges. Commercial feasibility of a cobalt-catalyzed process for production of diethyl ketone would be enhanced markedly by a process producing predominately diethyl ketone when operating at pressures substantially lower than 300 atmospheres and requiring comparatively low temperatures.

Alderson, in U.S. Pat. No. 3,059,031, issued Oct. 16, 1962, discloses that, in the production of diethyl ketone from ethylene, carbon monoxide, and hydrogen (from water), tertiary amine enhances the effectiveness of group VIII noble metal halide, but that tertiary amine, e.g., pyridine, is ineffective in activating a group VIII base metal as a catalyst.

SUMMARY OF THE INVENTION

It has now been found that diethyl ketone is produced in high selectivity and rate from the reaction of ethylene, carbon monoxide and hydrogen at a temperature of from about 50°C to about 150°C and a pressure of about 50 to 2,000 psig in the presence of a cobalt carbonyl catalyst and a catalytic amount of ammonia or a primary or tertiary amine as catalyst promoter to increase the initial rate of reaction and to increase the selectivity.

DESCRIPTION OF PREFERRED EMBODIMENTS

The cobalt carbonyl catalyst required for the process of the invention can be prepared by a diversity of methods. A convenient method is to combine a cobalt salt, organic or inorganic, with a relatively volatile hydrocarbon solvent, for example, in liquid phase followed by reduction and carbonylation. Suitable cobalt salts comprise, for example, cobalt carboxylates such as acetates, octanoates, and the like, as well as cobalt salts of mineral acids such as chlorides, fluorides, sulfates, sulfonates, and the like. Operable also are mixtures of these cobalt salts. It is preferred, however, that when mixtures are used, at least one component of the mixture be cobalt alkanoate of 6 to 12 carbon atoms. The valence state of the cobalt may be reduced and the cobalt carbonyl formed by heating the solution in an atmosphere of hydrogen and carbon monoxide and the hydrocarbon distilled off. Alternatively, the catalyst system can be obtained by simple addition of crystalline dicobalt octacarbonyl.

During the operation of the process with cobalt carbonyl catalyst alone (see, for example, Example I hereinbelow) it has been observed that the rate of reaction is slow and the selectivity to the diethyl ketone product is low such that diethyl ketone is not the predominating product. It has been found that unexpectedly by addition of a specific amount of certain amines to the catalyst system as catalyst promoters markedly increases the rate of reaction and increases the selectivity to diethyl ketone so that diethyl ketone is predominately produced in the process. The amount of amine catalyst promoter is singularly critical. The amount required is from about 0.3 to about 1.5 moles of amine per gram atom of cobalt present in the catalyst. Preferably, the amount of amine used is from 0.5 to about 1.0 mole of amine per gram atom of cobalt. At greater amounts, for example, at about 2.0 moles of amine per gram atom of cobalt the effect is reversed, that is, the rate of reaction is reduced to a negligible value. Surprisingly, the amines that are effective for the hereinabove described purpose are ammonia and primary and tertiary amines. Suitable primary and tertiary amines are mono- to diamines containing only aromatic unsaturation. The amines are suitably hydrocarbyl amines having only atoms of carbon or hydrogen besides the amino nitrogen atom(s) or are substituted-hydrocarbyl amines containing atoms of oxygen and halogen, particularly up to 2 atoms of halogen of atomic number from 18 to 35 inclusive, i.e., chlorine or bromine, which atoms are incorporated within functional groups such as ester and halo groups. Representative of the primary amines useful in the process includes methylamine, ethylamine, propylamine, n-butylamine, n-hexylamine, aniline, benzylamine, o-tolylamine, octylamine, nonylamine, decylamine, dodecylamine, 1-naphthylamine, 2-naphthylamine, and the like. Representative of the tertiary amines useful in the process includes trimethylamine, ethyldimethylamine, diethylmethylamine, pyridine, 3,4-lutidine, β-collidine, quinoline, pyrazine, 3-chloropyridine, 3,5-dichloropyridine, methyl nicotinate, and the like. By the term amine catalyst promoter is meant to include ammonia and also ammonium compounds which generate ammonia under the conditions at which the process is operated, such as ammonium carbamate and the like. Preferred are ammonia and primary or tertiary hydrocarbyl monoamines, said hydrocarbyl containing only aromatic unsaturation. Particularly preferred are primary or tertiary hydrocarbyl amines of up to 12 carbon atoms, especially benzylamine and pyridine.

The process of the invention is characterized by the requirement for only catalytic quantities of cobalt and the above-defined amine component. The ratio of catalyst to the ethylene reactant is generally not critical and may vary widely within the scope of the invention. Although utilization of larger amounts of cobalt carbonyl containing catalyst is not detrimental to the process of the invention, amounts larger than about 50 mole percent (calculated as cobalt metal) based on the reactant ethylene are not generally required. Amounts of cobalt less than about 0.1 mole percent on the same basis are generally unsuitable because of the inevitable physical losses of the catalyst during reaction and processing and the low rate of reaction. In most instances, amounts of catalysts from about 1 mole percent to about 10 mole percent based on ethylene are satisfactory and are preferred. The quantity of amine required is related to the amount of cobalt present, as described hereinbefore.

A particular advantage to the process of the invention resides in the high selectivities to diethyl ketone product and high rates of reaction achieved with the catalyst system. Thus, it is possible to obtain practical rates of reaction at lower temperatures. Temperatures employed will generally range between about 50°C and about 150°C and preferably between about 60°C and about 125°C. Advantages of operating at lower temperatures include lower carbon monoxide pressures and decreased corrosion. Consequently, initial partial pressures of carbon monoxide in the range from about 5 to about 2,000 psig, and particularly in the range of from about 50 to about 500 psig, are preferred. The hydrogen partial pressure is preferably always maintained lower than the carbon monoxide partial pressure for catalyst stability to be maintained. Thus, the molar ratio of carbon monoxide to hydrogen is preferably always greater than one. The hydrogen partial pressure may vary from about 0.1 atmosphere to about 500 psig. The hydrogen may be added all initially or preferably incrementally and it is preferably added in admixture with carbon monoxide. The ethylene reactant pressure may be from about 5 psig to about 2,000 psig. In general, the ethylene pressure should be at least double the hydrogen pressure; the molar ratio of ethylene to hydrogen is preferably always at least two, that is, two or greater. The total pressure of the system may vary from about 10 psig to about 2,500 psig and even higher. The unique reactivity of the catalyst system of the present invention at the lower pressures makes the use of pressures of about 2,000 psig and below particularly preferred. It is preferred that the total pressure of the system vary from about 50 psig to about 2,000 psig.

The process of the invention is carried out either in the absence of solvent or in the liquid phase with a suitable reaction solvent. Although solvents that are suitable are those capable of dissolving the reactants and catalyst, and are inert to the reactants and the products prepared therefrom, the reaction solvent especially functions as a solvent for the cobalt carbonyl catalyst. Therefore, a very low volume of solvent relative to high volume of reactants in gas phase is suitable. Optionally, for example, when reactants in gas phase are metered continuously to the reaction zone, a large liquid volume relative to volume of reactants in gas phase is desirable. Hence, there is no criticality to the amount of solvent present when one is employed. Although as mentioned hereinbefore, the solvent may be a material inert to the process, it also may be a material interacting with or complexing with the cobalt carbonyl catalyst as, for example, the nitriles of copending application of K. Nozaki, Ser. No. 885,997 filed Dec. 17, 1969. In either alternative, all that is required is that the solvent not contain any non-aromatic unsaturation, i.e., contain only aromatic unsaturation and contain nitrogen, when present, only in a nitrile functional group. Exemplary solvents are ethers, including dialkyl ethers such as diethyl ether, dibutyl ether and methyl hexyl ether; alkyl aryl ethers such as anisole and phenyl butyl ether; cyclic ethers such as tetrahydrofuran, dioxane and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether and glycerol triethyl ether; dialkyl ketones such as acetone and even the product itself, diethyl ketone; aliphatic acyclic and cyclic hydrocarbons such as hexane, decane, cyclohexane, and Decalin; aromatic hydrocarbons such as benzene, toluene, and xylene; alkanoic acid esters, e.g., metal acetate and isobutyl butyrate; halogenated hydrocarbons such as tetrachloroethylene and chlorobutane; sulfides such as butyl sulfide and 2,5-dimethylthiophene; sulfoxides such as dimethylsulfoxide; and nitriles such as those of the above-mentioned cofiled application, which are mono- to di-nitriles of from two to 10 carbon atoms, preferably two to seven, containing only aromatic unsaturation, and containing nitrogen only in the nitrile functional group, i.e., in the $-C \equiv N$ group. The nitrile functional group, i.e., the cyano group, is attached to a moiety which is saturated aliphatic, including cycloaliphatic, or is aromatic in character, preferably mononuclear aromatic. The moiety to which the nitrile functional group is attached is hydrocarbyl, that is, contains only atoms of carbon and hydrogen, or a substituted hydrocarbyl containing, besides atoms of carbon and hydrogen, other atoms such as oxygen, sulfur, and halogen, particularly oxygen atoms present in functional groups such as alkoxy, aryloxy, and alkanoyloxy. Such preferred non-hydrocarbyl substituents are alkoxy and alkanoyloxy wherein the alky or alkanoyl is one of from one to four carbon atoms. Illustrative of suitable nitriles are acetonitrile, propionitrile, butyronitrile, valeronitrile, octanonitrile, decanonitrile, phenyl-acetonitrile, cyclohexanecarbonitrile, benzonitrile, 2-toluenecarbonitrile, methoxyacetonitrile, 3-methoxypropionitrile, α-acetoxybutyronitrile, furonitrile, oxalonitrile, succinonitrile, adiponitrile, 1,4-cyclohexanedicarbonitrile, o-phthalonitrile, sebaconitrile, and the like. In general, nitriles which are mononitriles wherein the cyano group is attached to a hydrocarbyl moiety of one to six carbon atoms are preferred. Especially preferred are valeronitrile and benzonitrile.

Subsequent to reaction, the reaction mixture is separated and the desired diethyl ketone product recovered by conventional means such as selective extraction, fractional distillation, and chromatographic techniques. In a preferred mode of operation, utilizing solvent and amine promoter less volatile than the diethyl ketone product, the reaction mixture is passed from the reactor to a separator from whence is distilled the light gases and the diethyl ketone product at about atmospheric or lower pressure, leaving the cobalt carbonyl catalyst, amine promoter and solvent, as bottoms to be recirculated back to the reactor.

EXAMPLE I

To a 50-ml platinum-lined reactor were added 0.23 grams of cobalt carbonyl (in the form of dicobalt octacarbonyl), 1 gram of n-octane and 0.15 gram of benzylamine. Then 200 psig of ethylene, 250 psig of carbon monoxide and 50 psig of hydrogen were added to the reactor, and the vessel was heated to 100°C with agitation for 2 hours. The reaction mixture was then conducted to a separator from which were distilled the product components. Analysis indicated that conversion was 99 percent, based on hydrogen, with a selectivity of 90 percent to diethyl ketone, of 3 percent to propionaldehyde and of 7 percent to higher boiling products.

For purposes of comparison, the above experiment was repeated with the omission of the benzylamine. A conversion of 30 percent was obtained with a selectivity of 35 percent to diethyl ketone, of 60 percent to propionaldehyde and of 5 percent to aldol condensation products.

EXAMPLE II

Following the method of Example I, a series of experiments were conducted with various solvents and with no solvent utilized. The conditions and results therefrom are tabulated in Table I.

TABLE I

Conditions: 50-ml Reactor, 2 hr, 100°C, 0.23g $Co_2(CO)_8$, 0.15g $C_6H_5CH_2NH_2$, 200 psig $C_2H_4$, 250 psig CO, 50 psig $H_2$, and 1g solvent.

| Solvent | Conv, % | Selectivity $(C_2H_5)_2CO$, % | $C_2H_5CHO$, % | Other, % |
|---|---|---|---|---|
| Benzonitrile | 99 | 99+ | — | — |
| $(CH_3OCH_2CH_2)_2O$ | 95 | 95 | 1 | 4 |
| Diethyl Ketone | 99 | 90 | — | 10 |
| 2,5-Dimethylthiophene | 100 | 96 | 1 | 3 |
| Benzene | 96 | 94 | — | 6 |
| n-Butyl ether | 97 | 87 | 7 | 6 |
| Isobutyl butyrate | 99 | 93 | 3 | 4 |
| Cyclohexane | 99 | 90 | 3 | 7 |
| 1-Chlorobutane | 100 | 92 | 1 | 7 |
| Anisole | 99 | 95 | 2 | 3 |
| n-Butyl sulfide | 99 | 93 | 4 | 3 |
| n-Decane | 99 | 85 | 9 | 6 |
| Decalin | 99 | 94 | 3 | 3 |
| None | 98 | 92 | 2 | 6 |

EXAMPLE III

Following the method of Example I a series of experiments was conducted with various amine promoters utilized in a cobalt carbonyl-nitrile system. The conditions and results therefrom are tabulated in Table II.

TABLE II

Conditions: 50 ml reactor, 50 min, 100°C, 0.23g $Co_2(CO)_8$, 1g $C_6H_5CN$, 200 psig $C_2H_4$, 250 psig CO, 50 psig $H_2$

| Amine Promoter | Wt,g | Conv,% | Selectivity $(C_2H_5)_2CO$,% | $C_2H_5CHO$,% | Other,% |
|---|---|---|---|---|---|
| None | — | 21 | 70 | 30 | — |
| Benzylamine | 0.15 | 79 | 96.5 | 2.5 | 1 |
| n-Butylamine | 0.10 | 74 | 95.0 | 2.0 | 3 |
| Aniline | 0.13 | 68 | 97.5 | 2.5 | — |
| n-Hexylamine | 0.14 | 64 | 90 | 6.6 | 3.4 |
| Diethylmethylamine | 0.12 | 90 | 91 | 8 | 1 |
| Pyridine | 0.12 | 60 | 96 | 4 | — |
| 3,4-Lutidine | 0.15 | 30 | 95.5 | 4.5 | — |
| 3-Chloropyridine | 0.16 | 45 | 96.5 | 3.5 | — |
| Methyl nicotinate | 0.17 | 48 | 95 | 5 | — |
| Pyrazine | 0.11 | 58 | 98 | 2 | — |
| Trimethylamine | 0.10 | 90 | 95 | 5 | — |
| 2-Naphthylamine | 0.20 | 65 | 97 | 3 | — |
| Ammonia | 0.03 | 72 | 90 | 6 | 4 |
| Ammonium carbamate | 0.06 | 37 | 98 | 2 | — |

Under these conditions of 50-min operation the values for selectivity to diethyl ketone are more significant than the values for conversion of ethylene since the cobalt carbonyl-nitrile system is highly active even without promoters.

EXAMPLE IV

Following the method of Example I a series of experiments were conducted utilizing varying molar amounts of benzylamine per gram atom of cobalt. The conditions and results therefrom are tabulated in Table III.

I claim:
1. A liquid phase process of producing predominantly diethyl ketone by reacting ethylene, carbon monoxide and hydrogen in the presence of a catalytic amount of a cobalt carbonyl catalyst containing only cobalt and carbon monoxide and from about 0.3 to about 1.5 moles of an amine catalyst promoter selected from the group consisting of ammonia, a primary hydrocarbyl amine, and a tertiary hydrocarbyl amine, said hydrocarbyl containing only aromatic unsaturation and up to 12 carbon atoms, per gram atom of cobalt, at a temperature of from about 50° to about 150°C and a pressure of about 50 to about 150°C and a pressure of about 50 to about 2,000 psig. the molar ratio of ethylene to hydrogen being at least two and the ratio of carbon monoxide to hydrogen being greater than one.

2. The process of claim 1 wherein said amine is ammonia.

3. The process of claim 1 wherein said temperature

TABLE III

| Moles Benzylamine/Gram Atom Cobalt | Time, hr | Temp, °C | Solvent | Solvent Wt. g | $C_2H_4$, psig | CO, psig | $H_2$, psig | Conv, % | Selectivity $(C_2H_5)_2CO$, % | $C_2H_5CHO$, % | Other, % |
|---|---|---|---|---|---|---|---|---|---|---|---|
| 0.5 | 2 | 100 | $C_6H_5CN$ | 10 | 200 | 250 | 50 | 95 | 99 | 1 | — |
| 1.0 | 2 | 100 | $C_6H_5CN$ | 10 | 200 | 250 | 50 | 99 | >99 | — | — |
| 2.0 | 2 | 100 | $C_6H_5CN$ | 10 | 200 | 250 | 50 | 3 | — | — | — |
| 1.0 | 4 | 80 | $C_6H_5CN$ | 10 | 200 | 250 | 50 | 89 | 98 | — | 2 |
| 1.0 | 4 | 80 | $C_6H_5CN$ | 10 | 100 | 125 | 25 | 94 | >99 | — | — |
| 1.0 | 4 | 80 | $C_6H_5CN$ + $(C_2H_5)_2CO$ | 10+20 | 200 | 250 | 50 | 95 | 91 | — | 9 |
| 1.0 | 20 | 60 | $C_6H_5CN$ | 10 | 200 | 250 | 50 | 99 | 97 | 1 | 2 |
| 1.0 | 4 | 80 | $(CH_3OC_2H_4)_2O$ | 10 | 200 | 250 | 50 | 88 | 95 | 2 | 3 | is from about 60° to about 125°C.

4. The process of claim 1 wherein said amine is benzylamine.

5. The process of claim 1 wherein said amine is pyridine.

6. The process of claim 3 wherein the cobalt carbonyl catalyst is dicobalt octacarbonyl.

7. The process of claim 3 wherein the cobalt carbonyl catalyst is prepared by reduction and carbonylation of a cobalt salt in liquid phase.

* * * * *